(12) United States Patent
Minaguchi et al.

(10) Patent No.: US 7,075,785 B2
(45) Date of Patent: Jul. 11, 2006

(54) ELECTRONIC APPARATUS

(75) Inventors: Hiroyuki Minaguchi, Higashimatsuyama (JP); Nobuyasu Tajima, Ome (JP); Masanori Sato, Ome (JP); Hidemi Itakura, Nishitama-gun (JP); Takayuki Arisaka, Ome (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 155 days.

(21) Appl. No.: 10/766,529

(22) Filed: Jan. 29, 2004

(65) Prior Publication Data

US 2004/0246669 A1 Dec. 9, 2004

(30) Foreign Application Priority Data

Jan. 31, 2003 (JP) .............................. 2003-024423

(51) Int. Cl.
*G06F 1/16* (2006.01)
(52) U.S. Cl. ..................................... 361/683; 312/223.1
(58) Field of Classification Search ................ 361/683, 361/680; 245/158, 168; 312/223.1, 223.2
See application file for complete search history.

(56) References Cited

U.S. PATENT DOCUMENTS 5,689,400 A * 11/1997 Ohgami et al. ............. 361/683
5,748,444 A * 5/1998 Honda et al. ................ 361/687
5,784,256 A * 7/1998 Nakamura et al. .......... 361/699
6,198,626 B1 * 3/2001 Nakajima et al. ........... 361/680
6,606,254 B1 * 8/2003 Yoneda ....................... 361/683
6,744,622 B1 * 6/2004 Lee et al. .................... 361/680
6,826,040 B1 * 11/2004 Wang .......................... 361/683
6,859,355 B1 * 2/2005 Chuang et al. .............. 361/680

FOREIGN PATENT DOCUMENTS

| JP | 07-064670 | 3/1995 |
| JP | 09-081271 | 3/1997 |
| JP | 2002-236523 | 8/2002 |

OTHER PUBLICATIONS

Japanese Office Action dated Mar. 29, 2005 for Appln. No. 2003-024423.
Japanese Office Action dated Dec. 6, 2005 for Appln. No. 2003-024423.

* cited by examiner

*Primary Examiner*—Lisa Lea-Edmonds
(74) *Attorney, Agent, or Firm*—Pillsbury Winthrop Shaw Pittman, LLP

(57) ABSTRACT

An electronic apparatus includes a lower housing, an electronic component provided in the lower housing, an upper housing connected to the lower housing, a plurality of fastening members fastening the upper housing and the lower housing to each other and fixed to the lower housing through the upper housing, and a plurality of top covers connected to the upper housing and covering the plurality of fastening members.

15 Claims, 7 Drawing Sheets

ELECTRONIC APPARATUS

CROSS-REFERENCE TO RELATED APPLICATIONS

This application is based upon and claims the benefit of priority from the prior Japanese Patent Application No. 2003-024423, filed Jan. 31, 2003, the entire contents of which are incorporated herein by reference.

BACKGROUND OF THE INVENTION

1. Field of the Invention

The present invention relates to an electronic apparatus.

2. Description of the Related Art

In general, a portable electronic apparatus has advantages that the apparatus is easily carried and freely usable even in a place where it can not be accessed to an external power. One example of the electronic apparatus is a book type portable computer. The book type portable computer includes a main body assembly having a flat square box shape, and a display device openably/closably connected to the main body assembly and having the flat square box shape. The main body assembly includes: a function unit having various functional modules such as input devices like a keyboard and various switches, a data processing circuit substrate, a hard disk drive, a compact disk (CD) drive and a digital versatile disk (DVD) drive; and an outer housing which houses the function unit. The outer housing includes a lower housing and a top cover having openings in which operation members of the input devices are exposed. The lower housing and the top cover are fastened each other by fastening members such as fixing screws, and The lower housing and the top cover are configured so that the fastening members can not be easily seen from the outside.

For example, in the main body assembly of the book type portable computer disclosed in Japanese Patent Application KOKAI Publication No. 2002-236523, the function unit and the top cover are fixed to a bottom case by the fixing screws (fastening members) stored in fixing screw (fastening member) storage concaves formed in the bottom surface of the bottom case (lower housing).

The fixing screws (fastening members) stored in the fixing screw (fastening member) storage concaves of the back surface of the bottom case (lower housing) can not been seen from the outside when the book type portable computer is used on a surface of something.

The electronic apparatuses having portability, such as the book type portable computers, are often carried by users. At this time, the electronic apparatuses are not bagged frequently and are carried in a bare state by the user's hand. The bottom surfaces of the bottom cases of the outer housings of the electronic apparatuses carried in this bare state can be seen clearly. As a result, the fixing screw (fastening member) storage concaves formed in the bottom surface of the bottom case and the heads of the fixing screws (fastening members) stored in the concaves are also can be seen clearly. In the portable computer in which a large number of functional modules are housed in the outer housing at a high density, a large number of fixing screws (fastening members) are used. Therefore, a large number of fixing screw (fastening member) storage concaves and a large number of heads of fixing screws (fastening members) stored in the concaves deteriorate an appearance quality of the portable computer (electronic apparatus) when it is carried in the bare state.

BRIEF SUMMARY OF THE INVENTION

According to one aspect of the invention, an electronic apparatus comprising: a lower housing; an electronic component provided in the lower housing; an upper housing connected to the lower housing; a plurality of fastening members fastening the upper housing and the lower housing to each other and fixed to the lower housing through the upper housing; and a plurality of top covers connected to the upper housing and covering the plurality of fastening members.

According to another aspect of the invention, an electronic apparatus comprising: a lower housing; an upper housing covering the lower housing and having first and second regions and a keyboard laying region located between the first and second regions; a plurality of fastening members fastening the upper housing to the lower housing through the upper housing; a first cover fixed to the upper housing and covering the first region and a part of the plurality of fastening members located therein; a keyboard laid on the keyboard laying region and having one and the other ends, one end thereof being engaged with a portion between the first cover and the first region; and a second cover fastened to the upper housing and covering the second region and a part of the plurality of fastening members located therein, the second cover together with the second region sandwiching the other end of the keyboard therebetween.

According to further aspect of the invention, an electronic apparatus comprising: a lower housing; an upper housing covering the lower housing and having first and second regions and a keyboard laying region located between the first and second regions; a plurality of fastening members fastening the upper housing to the lower housing through the upper housing at the first and second regions; a first cover covering the first region and a part of the plurality of fastening members located therein; a keyboard laid on the keyboard laying region; and a second cover covering the second region and a part of the plurality of fastening members located therein, the first cover, the keyboard, and the second cover are attached to the upper housing in this order.

BRIEF DESCRIPTION OF THE SEVERAL VIEWS OF THE DRAWING

The accompanying drawings, which are incorporated in and constitute a part of the specification, illustrate an embodiment of the invention, and together with the general description given above and the detailed description of the embodiment given below, serve to explain the principles of the invention.

DETAILED DESCRIPTION OF THE INVENTION

One embodiment of the present invention will be hereinafter described in detail with reference to the accompanying drawings.

Figure 1:
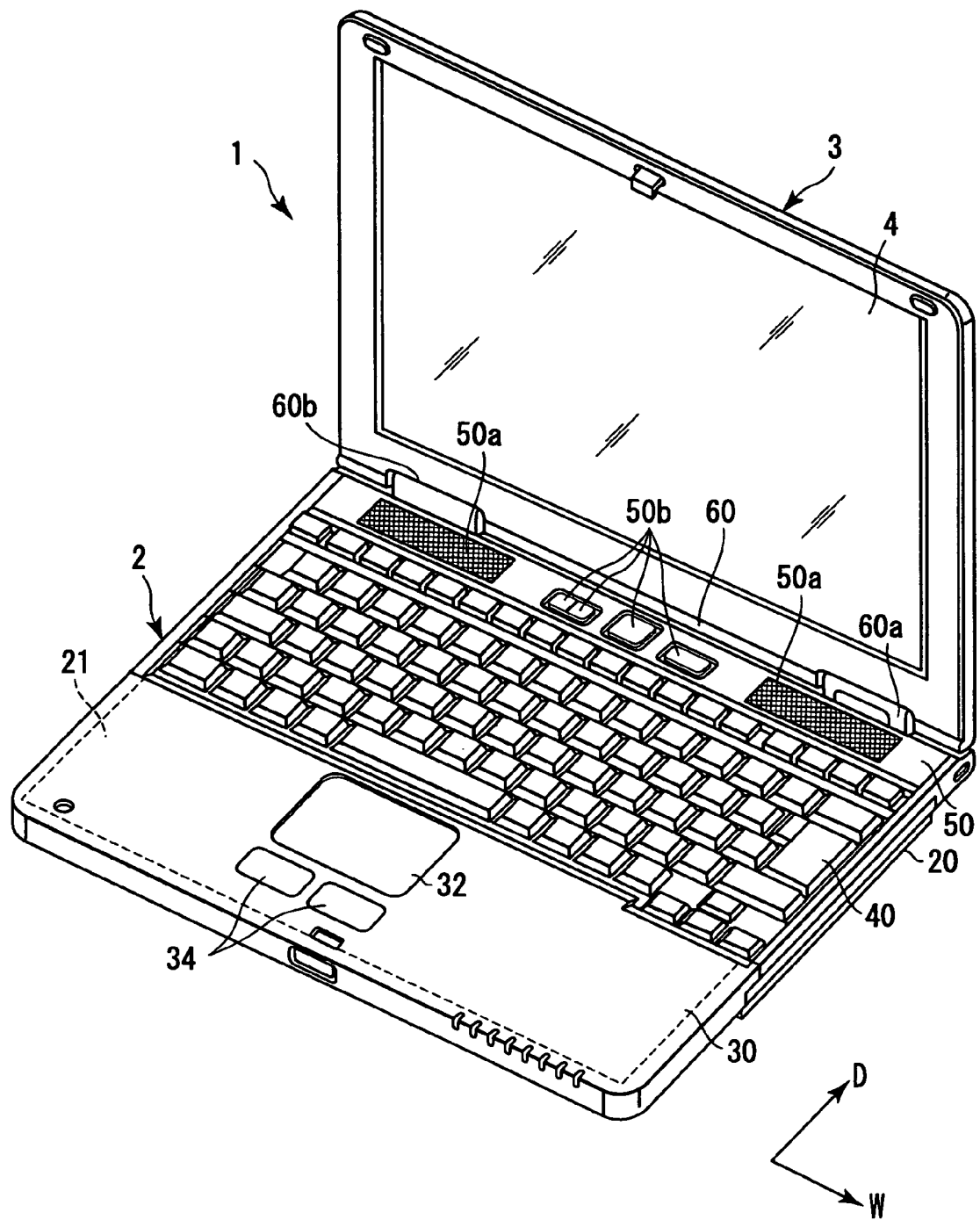
FIG. 1 is a perspective view showing an entire of a book type portable computer according to one embodiment of an electronic apparatus of the present invention, wherein a display device is located in an open position with respect to a main body assembly.

FIG. 1 is a perspective view showing a whole of a book type (or laptop type) portable computer 1 according to one embodiment of an electronic apparatus of the present invention. The portable computer 1 includes a substantially flat square box-shaped main body assembly 2, and a substantially flat square box-shaped display device 3 openably/closably connected to the main body assembly 2. The main body assembly 2 has a width direction W which is a longitudinal direction, and a depth direction D crossing the width direction W at right angles.

The main body assembly 2 includes a flat square-shaped lower housing 20 which opens upwards in FIG. 1. A function unit 21 including various function modules having at least one electronic component is housed in the lower housing 20, and a plurality of top covers are arranged above the lower housing 20. In more detail, a palm rest (first top cover) 30, a keyboard 40, and a holding cover (second top cover) 50 are arranged in this order toward a rear end of the lower housing 20 from a front end thereof in FIG. 1.

Each of the palm rest 30, keyboard 40, and holding cover 50 extends over a whole of the lower housing 20 in the width direction W. The above-described various function modules include a data processing device having various electronic components and processing data inputted by the keyboard 40 which is one of data input devices, a battery, a hard disk drive, a compact disk drive, a digital versatile disk drive, etc. Moreover, a display screen 4 of the display device 3 displays the data processed by this data processing device.

It is to be noted that a liquid crystal display unit is used in the display device 3 in the present embodiment, but various types of display units such as a plasma display unit and a cathode ray tube are also usable.

Two support legs 60a, 60b disposed apart from each other at a predetermined distance in the width direction W are fixed to a rear edge 60 of the lower housing 20 in FIG. 1. These support legs 60a, 60b openably/closably connect the display device 3 to the main body assembly 2, and also electrically connects the function unit 21 to the display device 3.

FIG. 1 shows an open position of the display device 3, and the display screen 4 of the display device 3 and the palm rest 30, keyboard 40, and holding cover 50 which are various top covers of the main body assembly 2 are exposed to an outer space. When the display device 3 is rotated around the two support legs 60a, 60b toward the various top covers of the main body assembly 2 from the open position shown in FIG. 1 and is disposed in a closed position in which the display device 3 covers the various top covers of the main body assembly 2, the palm rest 30, keyboard 40 and holding cover 50 included in the various top covers of the main body assembly 2 and the display screen 4 of the display device 3 are closed from the outer space.

A touch panel 32 and a plurality of operation buttons 34 are disposed substantially in a middle of the palm rest 30. A plurality of speaker holes 50a and a plurality of operation buttons 50b, including a power supply button, for operating various function modules of the function unit 21 are disposed in the holding cover 50.

Next, an assembling process of the main body assembly 2 of the portable computer 1 whose appearance is shown in FIG. 1 will be described with reference to FIGS. 2 to 7.

Figure 2:
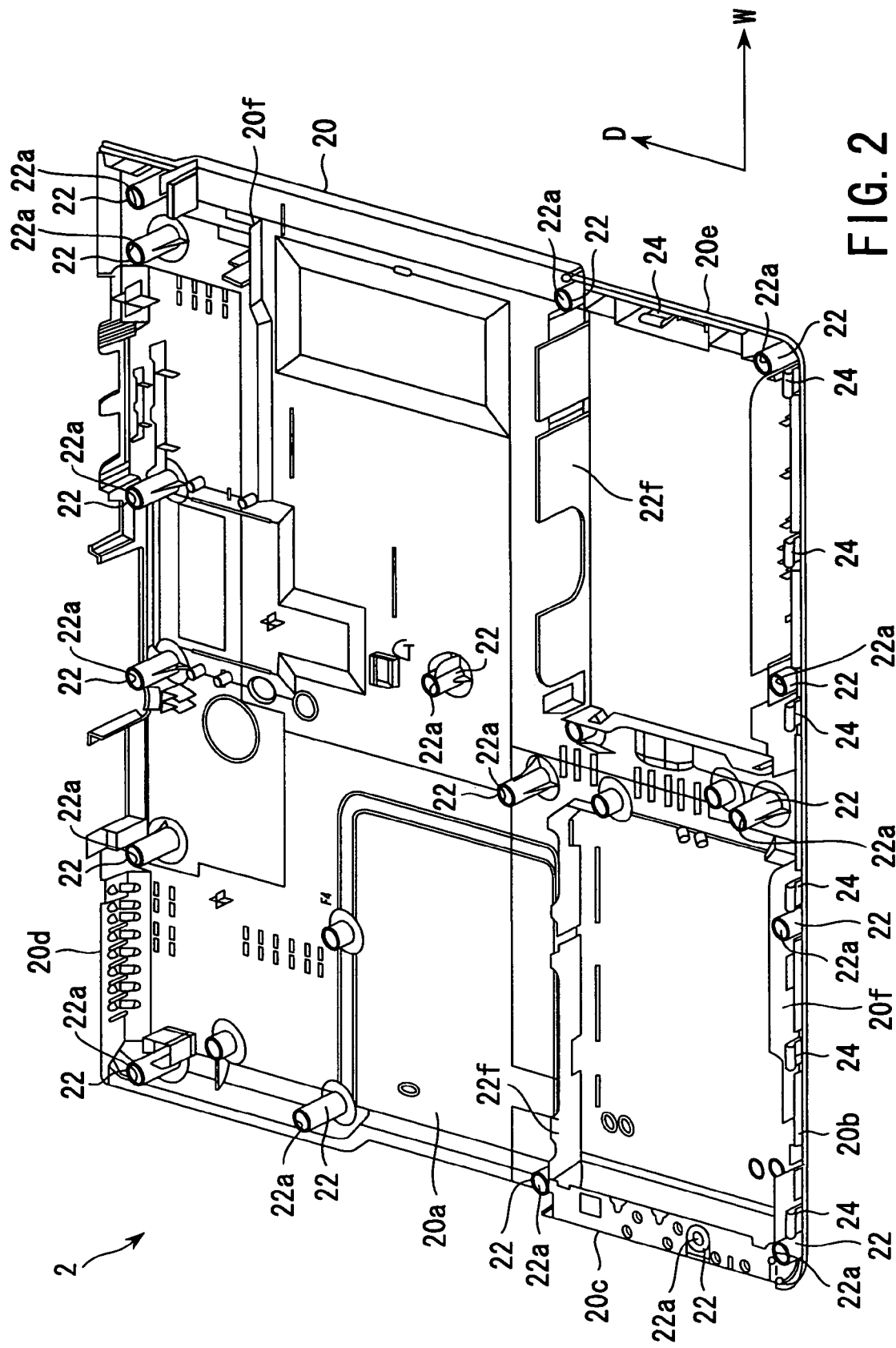
FIG. 2 is a perspective view showing only a lower housing which is a part of an outer housing of the main body assembly of FIG. 1.

FIG. 2 is a perspective view showing only the lower housing 20. The lower housing 20 includes a bottom wall 20a having a substantially rectangular plane shape and outer peripheral walls 20b to 20e rising upwards from four outer peripheral edges of the bottom wall 20a, and has a square box shape which opens upwards. A plurality of partition walls 20f are formed on the bottom wall 20a, and the various function modules of the function unit 21 such as the data processing device including various electronic components, the battery, the hard disk drive, the compact disk drive, the digital versatile disk drive, etc. are stored in a plurality of storage spaces defined on the upper surface of the bottom wall 20a by these partition walls 20f.

A plurality of bosses 22 protruding upwards from the bottom wall 20a are formed on a plurality of predetermined positions on the bottom wall 20a of the lower housing 20, and a screw hole 22a opening only upwards is formed in each of the bosses 22. In the present embodiment, the plurality of bosses 22 are arranged at a plurality of portions scattered along and disposed adjacent to inner peripheral surfaces of the outer peripheral walls 20b to 20e and wall surfaces of the partition walls 20f on the bottom wall 20a of the lower housing 20. That is, the plurality of bosses 22 are so arranged that they do not decrease capacities of the plurality of storage spaces defined on the bottom wall 20a of the lower housing 20 as much as possible.

A plurality of engaging pawls 24 are formed on the outer peripheral wall 20b, which is positioned on the front end of the lower housing 20, and the two outer peripheral walls 20c, 20d, which are positioned to separate from each other in the width direction W and extend in the depth direction D on the lower housing 20.

Figure 3:
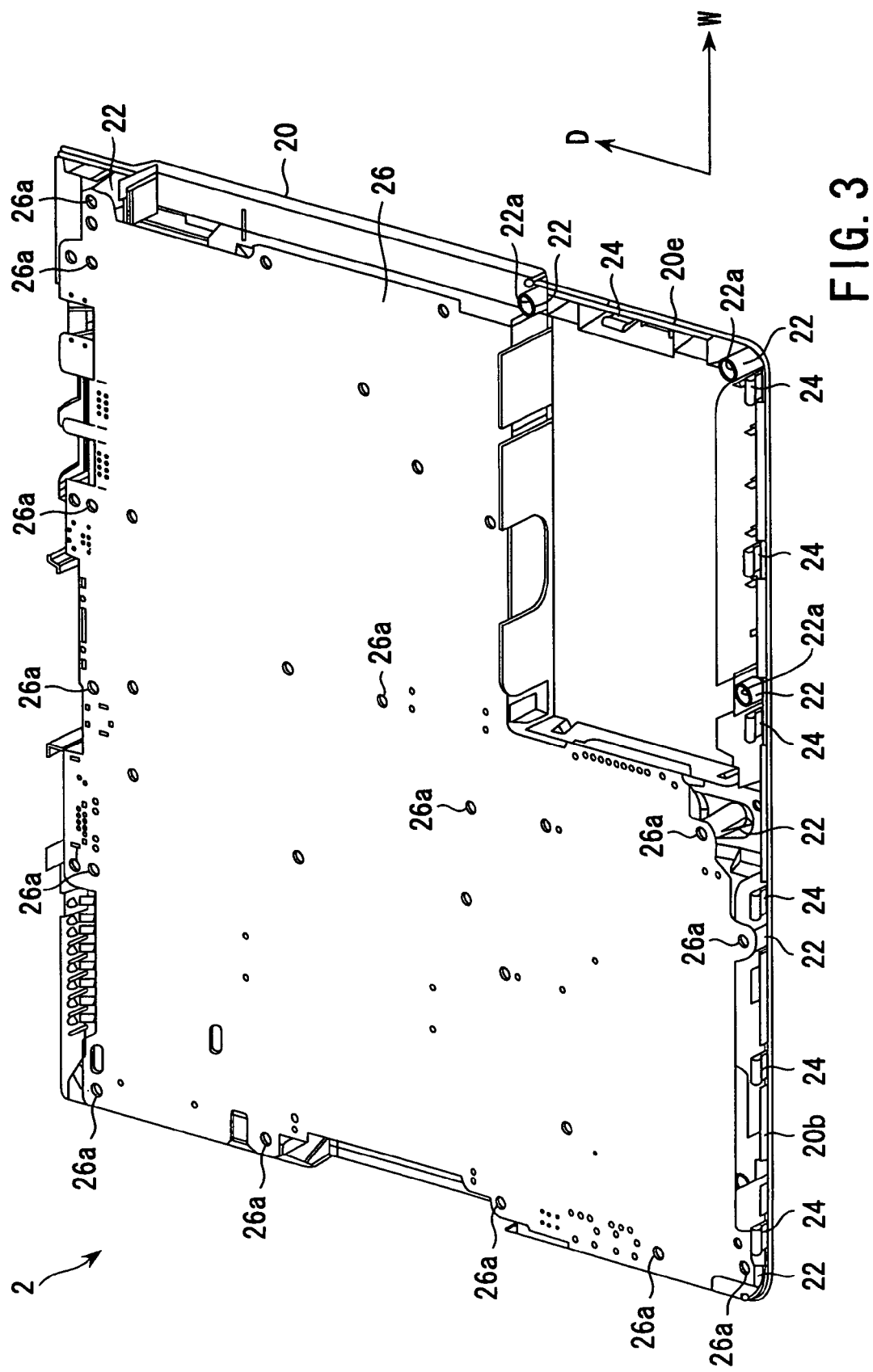
FIG. 3 is a perspective view showing that various functional modules including electronic components and housed in the lower housing of FIG. 2 are covered with an inner cover.

After arranging various function modules, which are described above and not shown, in the plurality of storage spaces defined on the bottom wall 20a of the lower housing 20 as described above, an inner cover 26 having a flat plate shape is disposed in an upward directed opening of the lower housing 20 and covers the upward directed opening and various function modules, as shown in FIG. 3. However, the inner cover 26 exposes the plurality of engaging pawls 24 of the lower housing 20 to the outer space.

A plurality of through holes 26a are formed in positions of the inner cover 26, corresponding to the screw holes 22a of the bosses 22 on the bottom wall 20a of the lower housing 20.

Figure 4:
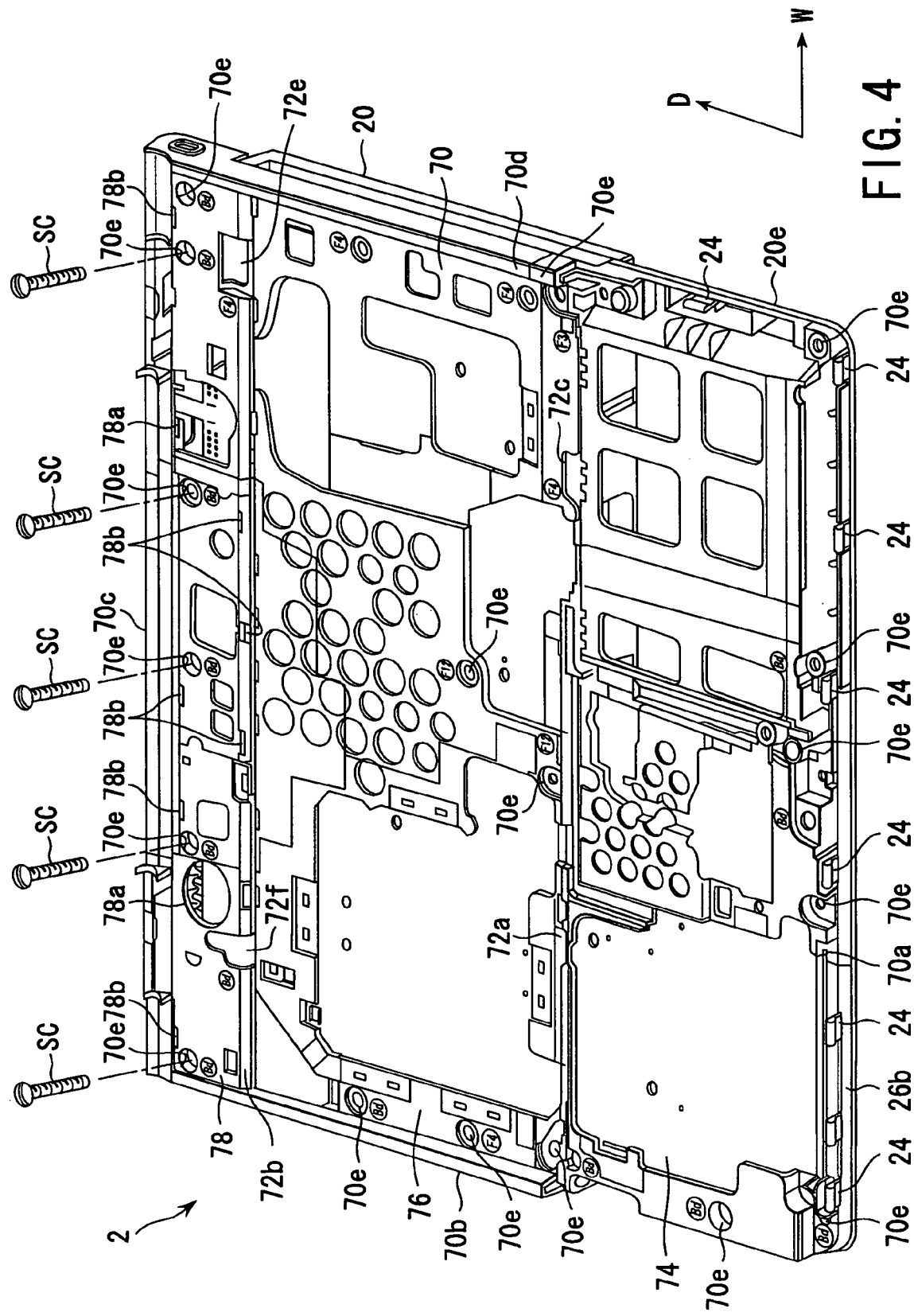
FIG. 4 is a perspective view showing that the inner cover of FIG. 3 is overlapped with an upper housing.

Next, as shown in FIG. 4, the upper surface of the inner cover 26 is covered with an upper housing 70. The upper housing 70 includes outer peripheral edges 70a to 70d having substantially the same plane shape as that of the outer peripheral edges of the bottom wall 20a of the lower housing 20, but expose the plurality of engaging pawls 24 of the lower housing 20 to the outer space. In the upper housing 70, a plurality of fastening holes 70e are formed to communicate with the screw holes 22a of the plurality of bosses 22 on the bottom wall 20a of the lower housing 20 and the plurality of through holes 26a of the inner cover 26.

Moreover, a fixing screw SC which is one type of fastening member is inserted into the fastening hole 70e of the upper housing 70. An end portion of the fixing screw SC reaches the screw hole 22a of the boss 22 on the bottom wall 20a of the lower housing 20 via the through hole 26a in the inner cover 26, and is subsequently screwed in the screw hole 22a. Accordingly, the lower housing 20, inner cover 26 and upper housing 70 are mutually integrally fixed in a state in which the function unit 21 is housed in the lower housing 20.

Portions surrounding the plurality of fastening holes 70e on the upper surface of the upper housing 70 are formed to be lower than portions distant from the surrounding portions on the upper surface of the upper housing 70 to constitute concaves. When the fixing screw SC as one type of fastening member is fitted in the corresponding screw hole 22a of the boss 22 on the bottom wall 20a of the lower housing 20 as described above, the head of the fixing screw SC does not protrude from the concave in the upper surface of the upper housing 70.

As seen from FIG. 4, first and second partition walls 72a, 72b extending substantially in parallel with the width direction W and over the whole upper surface of the upper housing 70 in the width direction W are formed at two positions disposed apart from each other at a predetermined distance in the depth direction D on the upper surface of the upper housing 70.

On the upper surface of the upper housing 70, a first region 74 is defined by the outer peripheral edge 70a on the front end, the first partition wall 72a disposed opposite to the outer peripheral edge 70a in the depth direction D, and two outer peripheral edges 70b, 70d disposed opposite to each other in the width direction W. Further, on the upper surface of the upper housing 70, a second region 78 is defined by the outer peripheral edge 70c on the rear end, the second partition wall 72b disposed opposite to the outer peripheral edge 70c in the depth direction D, and two outer peripheral edges 70b, 70d disposed opposite to each other in the width direction W. More further, on the upper surface of the upper housing 70, a keyboard laying region 76 is defined by two outer peripheral edges 70b, 70d disposed opposite to each other in the width direction W, and the first and second partition walls 72a, 72b disposed opposite to each other in the depth direction D. The keyboard laying region 76 is dented from the first and second regions 74, 78.

That is, the first region 74, the keyboard laying region 76 and the second region 78 are arranged in this order from the front edge to the rear edge on the upper surface of the upper housing 70. This means that the keyboard laying region 76 is arranged between the first region 74 and the second region 78 on the upper surface of the upper housing 70.

Two engaging holes 72c, 72d are formed in two positions disposed adjacent to the first partition wall 72a and apart from each other at a predetermined distance in the width direction W on the keyboard laying region 76, and two concaves 72e, 72f are formed in two positions disposed adjacent to the second partition wall 72b and apart from each other at a predetermined distance in the width direction W in the second region 78. These two concaves 72e, 72f communicate with the keyboard laying region 76 at the same height level as that of the keyboard laying region 76.

Further, two acoustic openings 78a are formed apart from each other at a predetermined distance in the width direction W in the second region 78. A plurality of engaging holes 78b are formed in the portion adjacent to the outer peripheral edge 70c on the rear end on the second region 78 and in the second partition wall 72b, and these engaging holes 78b are separated from one another at the predetermined distance in the width direction W.

A pair of speakers (not shown) included in various function modules of the function unit 21 are disposed on two acoustic openings 78a in the second region 78. Various switches including a power switch (not shown), which are various function modules of the function unit 21, are disposed between two acoustic openings 78a on the second region 78.

Figure 5:
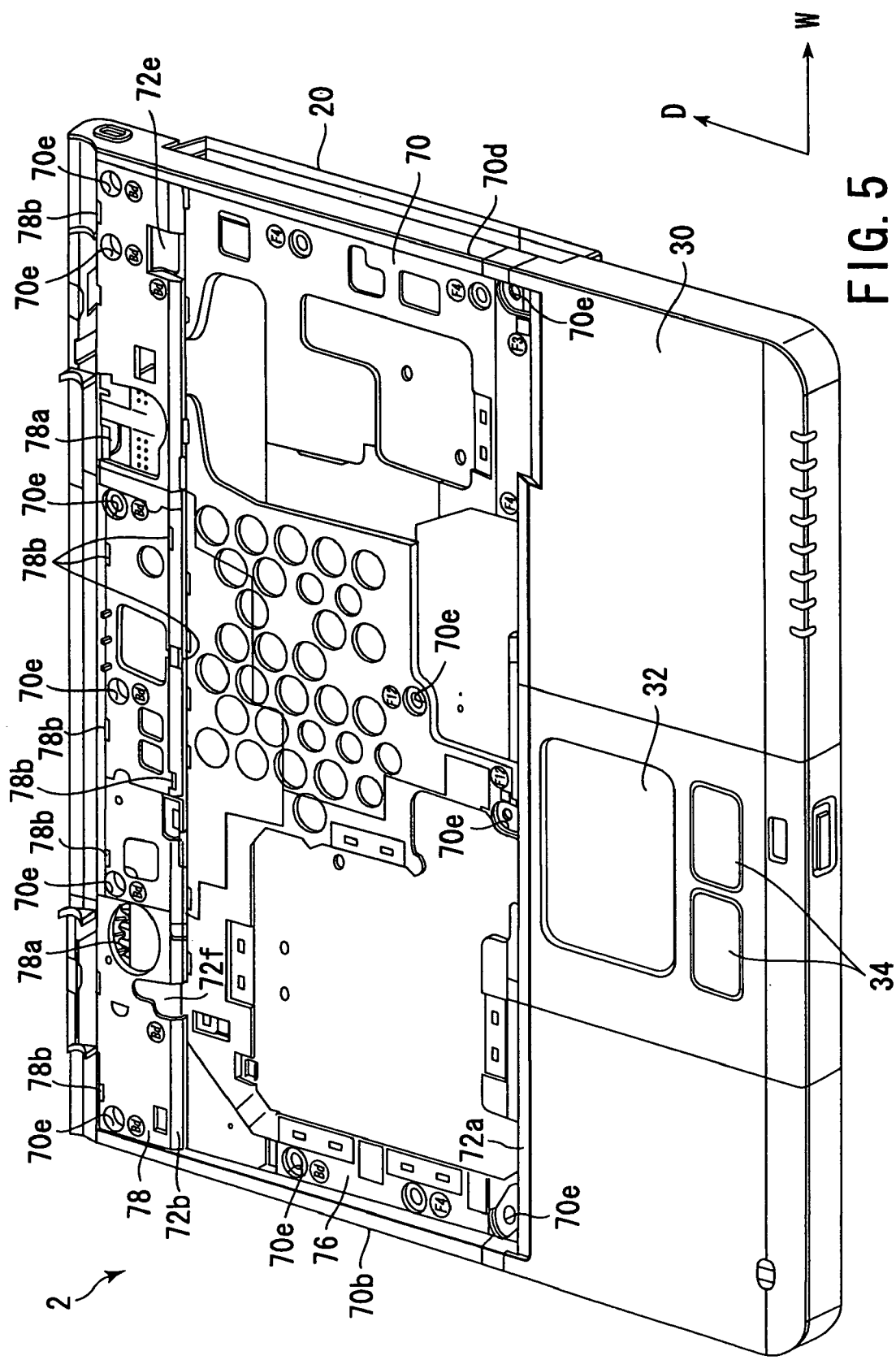
FIG. 5 is a perspective view showing that a front region of an upper surface of the upper housing of FIG. 4 is covered with a palm rest which is a part of a top cover.

Next, as shown in FIG. 5, the first region 74 of the upper housing 70 is covered with the palm rest 30 which is the first top cover. The palm rest 30 is engaged with the plurality of engaging pawls 24, which are formed on the outer peripheral wall 20b on the front end of the lower housing 20 and on the outer peripheral walls 20c, 20e disposed apart from each other in the width direction W, and is accordingly located on the first region 74 of the lower housing 20 and is fixed to the lower housing 20. The palm rest 30 fixed in this manner covers the heads of the plurality of fixing screws SC (see FIG. 4), which are the plurality of fastening members, inserted in the plurality of fastening holes 70e disposed in the first region 74 of the upper housing 70.

Figure 6:
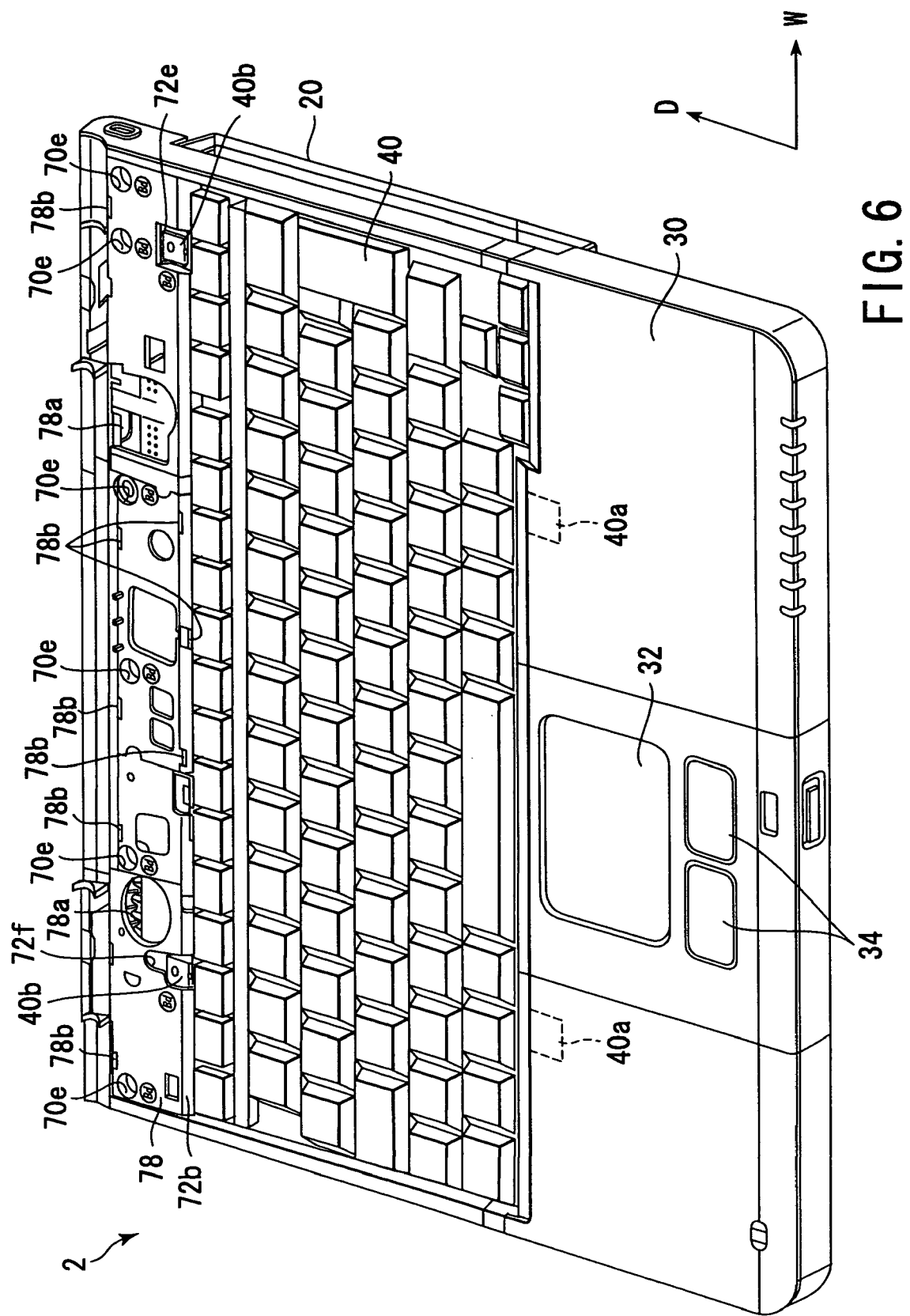
FIG. 6 is a perspective view showing that an intermediate region of the upper surface of the upper housing of FIG. 5 is covered with a keyboard which is one of the various functional modules and which is a part of the top cover.

Next, as shown in FIG. 6, the keyboard laying region 76 of the upper housing 70 is covered with the keyboard 40. The keyboard 40 includes two engaging pieces 40a disposed apart from each other at a predetermined distance in the width direction W on its front end adjacent to the first region 74 of the upper housing 70, and two engaging pieces 40b disposed apart from each other at the predetermined distance on its rear end adjacent to the second region 78 of the upper housing 70. The two engaging pieces 40a of the front end of the keyboard 40 protrude forwards from the front end, and two engaging pieces 40b of the rear end protrude backwards from the rear end.

The keyboard 40 is laid on the keyboard laying region 76 on the upper surface of the upper housing 70 as follows.

First, the keyboard 40 is disposed in a standing state, in which the front end of the keyboard 40 is directed downwards, above the keyboard laying region 76 of the upper surface of the upper housing 70. In this state, two engaging pieces 40a of the front end of the keyboard 40 are inserted in two engaging holes 72c, 72d (see FIG. 4) of the first partition wall 72a (see FIG. 4) of the upper surface of the upper housing 70.

Next, the rear end of the keyboard 40 is lowered toward the front end of the second region 78 of the upper surface of the upper housing 70, and two engaging pieces 40b on the rear end of the keyboard 40 are lowered into two concaves 72e, 72f formed in the second partition wall 72b.

In this state, the keyboard 40 covers the heads of the plurality of fixing screws SC (see FIG. 4), which are the plurality of fastening members, inserted in the plurality of fastening holes 70e disposed in the keyboard laying region 76 on the upper surface of the upper housing 70. Two engaging pieces 40a on the front end of the keyboard 40 inserted in the two engaging holes 72c, 72d (see FIG. 4) of the first partition wall 72a (see FIG. 4) are covered with the rear end of the palm rest 30. That is, the keyboard 40 of the present embodiment functions as one of the plurality of top covers which cover the plurality of fastening members fastening the upper housing 70 to the lower housing 20.

Figure 7:
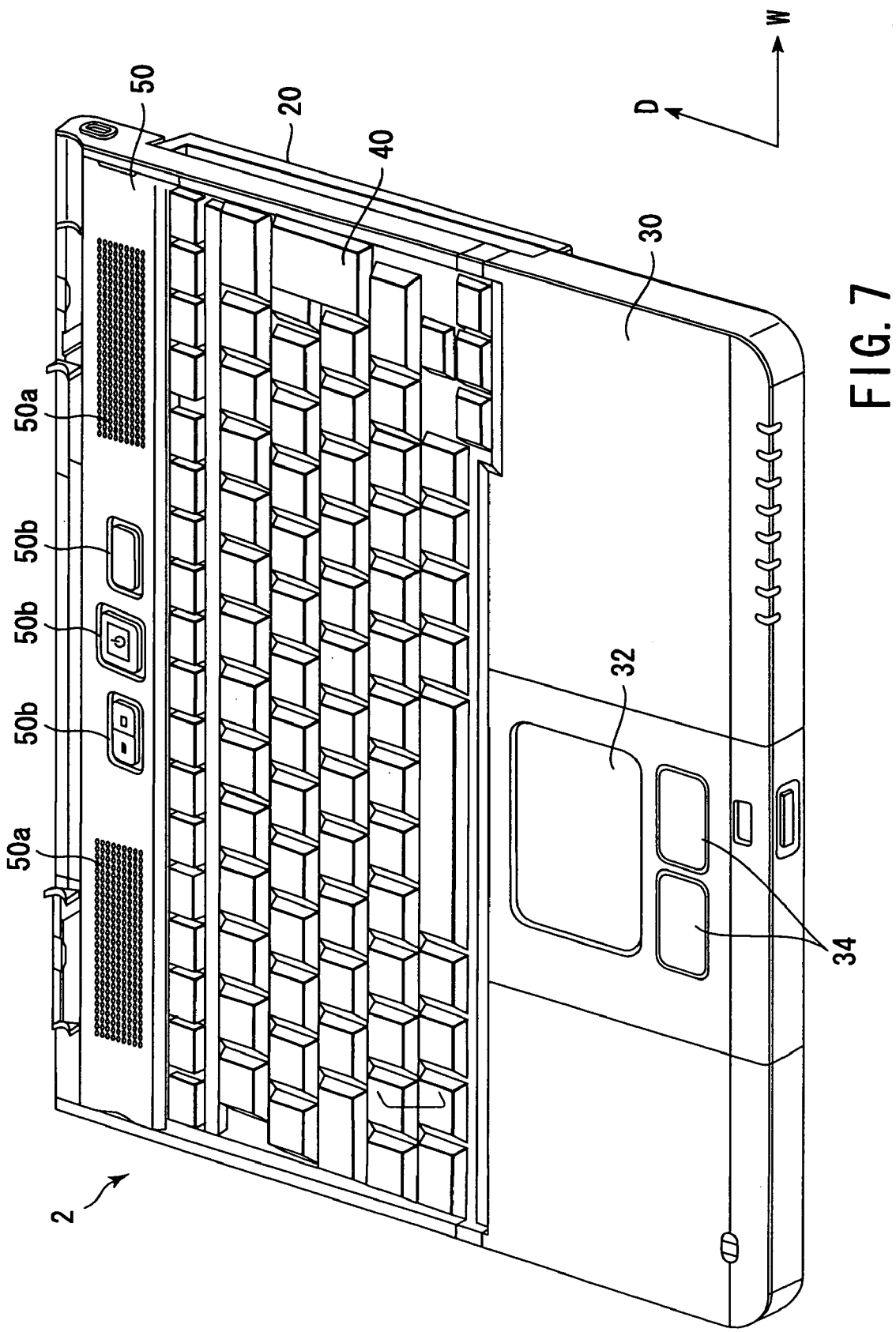
FIG. 7 is a perspective view showing that a rear region of the upper surface of the upper housing of FIG. 6 is covered with a holding cover which is a part of the top cover, and the whole upper surface of the upper housing of FIG. 4 is concealed.

After the keyboard 40 is laid on the keyboard laying region 76 on the upper surface of the upper housing 70 in this manner, the second region 78 of the upper surface of the lower housing 20 is covered with the holding cover 50, as shown in FIG. 7. The plurality of engaging pawls (not shown) of the holding cover 50 are engaged with the plurality of engaging holes 78b which are formed in the portion adjacent to the outer peripheral edge 70c on the rear end in the second region 78 of the upper housing 70 and are formed in the second partition wall 72b as shown in FIG. 6, so that the holding cover is fixed to the second region 78. In this state, the holding cover 50 covers the heads of the plurality of fixing screws SC (see FIG. 4) which are the plurality of fastening members inserted in the plurality of fastening holes 70e disposed in the second region 78 of the upper housing 70. The two engaging pieces 40b on the rear end of the keyboard 40 lowered into the two concaves 72e, 72f of the second partition wall 72b (see FIG. 4) are held between the second region 78 of the upper housing 70 and the holding cover 50, and are covered with the holding cover 50.

In the present embodiment, the palm rest 30 covering the first region 74 of the upper housing 70 is engaged with the plurality of engaging pawls 24 (see FIG. 4) of the lower housing 20 as described above and accordingly fixed to the lower housing 20. That is, the palm rest is fixed to at least one of the upper housing 70, inner cover 26 and lower housing 20 without using the fastening members such as the fixing screws SC (see FIG. 4).

However, at least one protruding portion to be placed on the keyboard laying region 76 on the upper surface of the upper housing 70 may be disposed on the rear edge of the palm rest 30. In this case, the protruding portion may be fixed to the keyboard laying region 76 or the inner cover 26 or lower housing 20 by at least one fastening member such as the fixing screw SC (see FIG. 4) inserted in at least one of the plurality of fastening holes 70e formed in the keyboard laying region 76 on the upper surface of the upper housing 70 (especially the first partition wall 72a disposed adjacent to the rear edge of the palm rest 30 on the upper housing 70). And, the head of at least one fastening member such as the fixing screw SC (see FIG. 4), which is used to fix the protruding portion of the rear edge of the palm rest 30 to the keyboard laying region 76 on the upper surface of the upper housing 70 as described above, is covered with the keyboard 40 laid on the keyboard laying region 76 on the upper surface of the upper housing 70, and is therefore not exposed to the outer space.

Moreover, in the present embodiment, after the keyboard 40 is laid on the keyboard laying region 76 on the upper surface of the upper housing 70, the engaging pieces 40a on the front end of the keyboard 40 and the engaging pieces 40b on the rear end thereof are not fixed to the first region 74, keyboard laying region 76 and second region 78 on the upper surface of the upper housing 70 by the fastening members such as the fixing screws SC (see FIG. 4), and are not fastened to the inner cover 26 and/or lower housing 20 located below the upper housing 70 by the fastening members such as the fixing screws SC (see FIG. 4). The engaging pieces 40a on the front end of the keyboard 40 are engaged with the two engaging holes 72c, 72d (see FIG. 4) of the first partition wall 72a (see FIG. 4) on the upper surface of the upper housing 70 while the engaging pieces 40b on the rear end of the keyboard 40 are held by the second region 78 on the upper surface of the upper housing 70 and the holding cover 50, so that the keyboard is fixed to the keyboard laying region 76.

However, the two engaging pieces 40b on the rear end of the keyboard 40 may be fixed to the two concaves 72e, 72f in the second region 78 on the upper surface of the upper housing 70 or the inner cover 26 and/or lower housing 20 located below the upper housing 70 by the fastening members such as the fixing screws SC (see FIG. 4). In this case, the heads of the fastening members such as the fixing screws SC (see FIG. 4) used to fix the two engaging pieces 40b of the rear end of the keyboard 40 as described above are covered with the holding cover 50 which covers the second region 78 of the upper surface of the upper housing 70, and are not exposed to the outer space.

Moreover, when the holding cover 50 is fixed to the second region 78 of the upper surface of the upper housing 70, the two speaker holes 50a and the plurality of operation members 50b including the power button, which are disposed on the holding cover 50, are located above the two speakers and the plurality of switches including the power switch (not shown), which are various function modules disposed on the second region 78 as described above, so that the two speakers and the plurality of switches (not shown) can be performed.

As described above with reference to FIGS. 2 to 7, the main body assembly 2 in the present embodiment is assembled. Here, the upper housing 70 is fixed to the lower housing 20 by the plurality of fixing screws SC which are the plurality of fastening members fastening into the lower housing 20 from the upper housing 70. However, the heads of the plurality of fixing screws SC, exposed on the upper surface of the upper housing 70 are completely covered with the palm rest 30, keyboard 40 and holding cover 50 included in the plurality of top covers. Therefore, even when the portable computer 1 is seen from any direction, the plurality of fixing screws SC as the plurality of fastening members cannot be seen from the outer space.

As described above, in the present embodiment, the palm rest 30, which is one of the plurality of top covers and which covers the first region 74 on the upper surface of the upper housing 70, is fixed to the lower housing 20 by the plurality of engaging pawls 24 of the lower housing 20. The keyboard 40, which is one of the plurality of top covers and which covers the keyboard laying region 76 on the upper surface of the upper housing 70, is fixed to the upper surface of the upper housing 70 by the engagement with the first region 72 on the upper surface of the upper housing 70 and by the holding between the second region 78 on the upper surface of the upper housing 70 and the holding cover 50. And, the holding cover 50, which is one of the plurality of top covers and which covers the second region 78 on the upper surface of the upper housing 70, is fixed to the upper housing 70 by the engaging pawls (not shown) of the holding cover 50.

However, for a structure for fixing the palm rest 30, keyboard 40 and holding cover 50 included in the plurality of top covers to either of the upper housing 70 and the lower housing 30, various fixing structures other than the above-described fixing structure can be used if the various fixing structures cannot be seen from the outer space.

Furthermore, the palm rest 30 may be fixed to only the upper housing 70 or both the upper housing 70 and the lower housing 30. The holding cover 50 may be fixed to only the lower housing 30 or both the upper housing 70 and the lower housing 30.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An electronic apparatus comprising:
    a lower housing;
    an electronic component provided in the lower housing;
    an upper housing connected to the lower housing;
    a plurality of fastening members fixed to the lower housing through the upper housing; and
    a plurality of top covers connected to the upper housing and covering the plurality of fastening members,
    wherein the upper housing is fastened to the lower housing by the plurality of fastening members without exposing the plurality of fastening members.

2. An electronic apparatus according to claim 1, wherein at least one of the top covers is fixed to the lower housing by an engaging unit.

3. An electronic apparatus according to claim 2, wherein at least one of the top covers is fixed to the upper housing by an engaging unit.

4. An electronic apparatus according to claim 3, wherein at least two of the top covers overlap with each other at their ends.

5. An electronic apparatus according to claim 2, wherein at least two of the top covers overlap with each other at their ends.

6. An electronic apparatus according to claim 1, wherein one of the top covers is a keyboard.

7. An electronic apparatus according to claim 1, wherein at least one of the top covers is fixed to the upper housing by an engaging unit.

8. An electronic apparatus according to claim 1, wherein at least two of the top covers overlap with each other at their ends.

9. An electronic apparatus comprising:
    a lower housing;
    an upper housing covering the lower housing and having first and second regions and a keyboard laying region located between the first and second regions;
    a plurality of fastening members fixed to the lower housing through the first, second and keyboard laying regions of the upper housing;
    a first cover fixed to the upper housing and covering the first region and a part of the plurality of fastening members located therein;
    a keyboard laid on the keyboard laying region and having one and the other ends, one end thereof being engaged with a portion between the first cover and the first region, the keyboard covering a part of the plurality of fastening members located in the keyboard laying region when the keyboard is laid on the keyboard laying region; and
    a second cover fastened to the upper housing and covering the second region and a part of the plurality of fastening members located therein, the second cover together with the second region sandwiching the other end of the keyboard therebetween,
    wherein the upper housing is fastened to the lower housing by a plurality of fastening members without exposing the plurality of fastening members.

10. An electronic apparatus according to claim 9, wherein the first cover forms a palm rest.

11. An electronic apparatus according to claim 9, wherein a switch is mounted on the second region, an operation button is provided on the second cover, and the operation button is used to operate the switch when the second cover is fixed to the second region.

12. An electronic apparatus comprising:
    a lower housing;
    an upper housing covering the lower housing and having first and second regions and a keyboard laying region located between the first and second regions;
    a plurality of fastening members fastening the upper housing to the lower housing through the upper housing at the first and second regions;
    a first cover covering the first region and a part of the plurality of fastening members located therein;
    a keyboard laid on the keyboard laying region; and
    a second cover covering the second region and a part of the plurality of fastening members located therein, the first cover, the keyboard, and the second cover being attached to the upper housing in this order.

13. An electronic apparatus according to claim 12, wherein the keyboard has one and the other ends, one end of the keyboard is engaged with a portion between the first cover and the first region, and the other end of the keyboard is sandwiched between the second cover and the second region.

14. An electronic apparatus according to claim 13, wherein the other end of the keyboard is fixed to the second region by a fixing screw, and the second cover covers the fixing screw.

15. An electronic apparatus according to claim 14, wherein the keyboard laying region of the upper housing is fastened to the lower housing by a part of the fastening members, and the keyboard covers the part of the fastening members when the keyboard is laid on the keyboard laying region.

* * * * *